United States Patent
Bradfield

(10) Patent No.: US 8,593,021 B2
(45) Date of Patent: Nov. 26, 2013

(54) COOLANT DRAINAGE SYSTEM AND METHOD FOR ELECTRIC MACHINES

(75) Inventor: Michael D. Bradfield, Anderson, IN (US)

(73) Assignee: Remy Technologies, LLC, Pendleton, IN (US)

( * ) Notice: Subject to any disclaimer, the term of this patent is extended or adjusted under 35 U.S.C. 154(b) by 344 days.

(21) Appl. No.: 12/897,634

(22) Filed: Oct. 4, 2010

(65) Prior Publication Data

US 2012/0080117 A1  Apr. 5, 2012

(51) Int. Cl.
*H02K 9/19* (2006.01)

(52) U.S. Cl.
USPC .............................. 310/54; 310/57; 310/60 A

(58) Field of Classification Search
USPC .................... 310/52, 54, 57–59, 60 A, 89
See application file for complete search history.

(56) References Cited

U.S. PATENT DOCUMENTS

| | | | |
|---|---|---|---|
| 2,080,678 A | | 5/1937 | Van Horn et al. |
| 2,264,616 A | | 12/1941 | Buckbee |
| 3,127,530 A | * | 3/1964 | White .............................. 310/54 |
| 3,447,002 A | | 5/1969 | Ronnevig |
| 3,525,001 A | | 8/1970 | Erickson |
| 3,648,766 A | * | 3/1972 | Whalen .......................... 165/253 |
| 3,748,507 A | | 7/1973 | Sieber |
| 4,038,570 A | | 7/1977 | Durley, III |
| 5,081,382 A | | 1/1992 | Collings et al. |
| 5,180,004 A | | 1/1993 | Nguyen |
| 5,207,121 A | | 5/1993 | Blen |
| 5,293,089 A | | 3/1994 | Frister |
| 5,295,531 A | * | 3/1994 | Tsunekawa et al. ......... 165/48.1 |
| 5,372,213 A | | 12/1994 | Hasebe et al. |
| 5,448,118 A | * | 9/1995 | Nakamura et al. .............. 310/54 |
| 5,519,269 A | | 5/1996 | Lindberg |
| 5,616,973 A | | 4/1997 | Khazanov |
| 5,718,825 A | * | 2/1998 | Greive et al. ................... 210/298 |
| 5,859,482 A | | 1/1999 | Crowell et al. |
| 5,923,108 A | | 7/1999 | Matake et al. |
| 5,937,817 A | | 8/1999 | Schanz et al. |
| 5,965,965 A | | 10/1999 | Umeda et al. |
| 6,011,332 A | | 1/2000 | Umeda et al. |
| 6,069,424 A | | 5/2000 | Colello et al. |

(Continued)

FOREIGN PATENT DOCUMENTS

| | | |
|---|---|---|
| JP | 05-103445 A | 4/1993 |
| JP | 05-292704 A | 11/1993 |

(Continued)

OTHER PUBLICATIONS

International Search Report, Received Jul. 31, 2012.

(Continued)

*Primary Examiner* — Tran Nguyen
(74) *Attorney, Agent, or Firm* — Greenberg Traurig LLP

(57) ABSTRACT

Embodiments of the invention provide a coolant drainage system including a module housing and a drain pan coupled to the module housing. The module housing at least partially defines a machine cavity and includes an inner wall and at least one end cap at least partially enclosing an electric machine within the machine cavity. The coolant drainage system also includes a plurality of drain holes through the module housing and adjacent to the drain pan. The plurality of drain holes provide fluid pathways from the machine cavity to the drain pan.

7 Claims, 6 Drawing Sheets

(56) References Cited

U.S. PATENT DOCUMENTS

| | | |
|---|---|---|
| 6,075,304 A | 6/2000 | Nakatsuka |
| 6,087,746 A | 7/2000 | Couvert |
| 6,095,754 A | 8/2000 | Ono |
| 6,097,130 A | 8/2000 | Umeda et al. |
| 6,114,784 A | 9/2000 | Nakano |
| 6,147,430 A | 11/2000 | Kusase et al. |
| 6,147,432 A | 11/2000 | Kusase et al. |
| 6,173,758 B1 | 1/2001 | Ward et al. |
| 6,181,043 B1 | 1/2001 | Kusase et al. |
| 6,201,321 B1 | 3/2001 | Mosciatti |
| 6,208,060 B1 | 3/2001 | Kusase et al. |
| 6,232,687 B1 | 5/2001 | Hollenbeck et al. |
| 6,242,836 B1 | 6/2001 | Ishida et al. |
| 6,291,918 B1 | 9/2001 | Umeda et al. |
| 6,300,693 B1 | 10/2001 | Poag et al. |
| 6,313,559 B1 | 11/2001 | Kusase et al. |
| 6,333,573 B1 | 12/2001 | Nakamura |
| 6,335,583 B1 | 1/2002 | Kusase et al. |
| 6,346,758 B1 | 2/2002 | Nakamura |
| 6,359,232 B1 | 3/2002 | Markovitz et al. |
| 6,404,628 B1 | 6/2002 | Nagashima et al. |
| 6,417,592 B2 | 7/2002 | Nakamura et al. |
| 6,459,177 B1 | 10/2002 | Nakamura et al. |
| 6,509,665 B1 | 1/2003 | Nishiyama et al. |
| 6,515,392 B2 | 2/2003 | Ooiwa |
| 6,522,043 B2 | 2/2003 | Measegi |
| 6,559,572 B2 | 5/2003 | Nakamura |
| 6,579,202 B2 | 6/2003 | El-Antably et al. |
| 6,770,999 B2 | 8/2004 | Sakurai |
| 6,897,594 B2 | 5/2005 | Ichikawa et al. |
| 6,903,471 B2 | 6/2005 | Arimitsu et al. |
| 6,998,749 B2 | 2/2006 | Wada et al. |
| 7,002,267 B2 | 2/2006 | Raszkowski et al. |
| 7,026,733 B2 | 4/2006 | Bitsche et al. |
| 7,157,818 B2 * | 1/2007 | Jones .......................... 310/63 |
| 7,239,055 B2 | 7/2007 | Burgman et al. |
| 7,276,006 B2 | 10/2007 | Reed et al. |
| 7,284,313 B2 | 10/2007 | Raszkowski et al. |
| 7,339,300 B2 | 3/2008 | Burgman et al. |
| 7,352,091 B2 | 4/2008 | Bradfield |
| 7,402,923 B2 | 7/2008 | Klemen et al. |
| 7,417,344 B2 | 8/2008 | Bradfield |
| 7,508,100 B2 | 3/2009 | Foster |
| 7,538,457 B2 | 5/2009 | Holmes et al. |
| 7,545,060 B2 | 6/2009 | Ward |
| 7,592,045 B2 | 9/2009 | Smith et al. |
| 7,615,903 B2 | 11/2009 | Holmes et al. |
| 7,615,951 B2 | 11/2009 | Son et al. |
| 7,667,359 B2 | 2/2010 | Lee et al. |
| 7,939,975 B2 | 5/2011 | Saga et al. |
| 8,067,865 B2 | 11/2011 | Savant |
| 8,068,327 B2 | 11/2011 | Seifert et al. |
| 2003/0222519 A1 * | 12/2003 | Bostwick ....................... 310/58 |
| 2004/0036367 A1 | 2/2004 | Denton et al. |
| 2004/0189110 A1 | 9/2004 | Ide et al. |
| 2004/0195929 A1 | 10/2004 | Oshidari |
| 2005/0023266 A1 | 2/2005 | Ueno et al. |
| 2005/0023909 A1 * | 2/2005 | Cromas et al. .................. 310/58 |
| 2005/0194551 A1 | 9/2005 | Klaussner et al. |
| 2005/0274450 A1 | 12/2005 | Smith et al. |
| 2005/0285456 A1 | 12/2005 | Amagi et al. |
| 2007/0024130 A1 | 2/2007 | Schmidt |
| 2007/0052313 A1 | 3/2007 | Takahashi |
| 2007/0063607 A1 | 3/2007 | Hattori |
| 2007/0145836 A1 | 6/2007 | Bostwick |
| 2007/0149073 A1 | 6/2007 | Klaussner et al. |
| 2007/0216236 A1 | 9/2007 | Ward |
| 2008/0203866 A1 * | 8/2008 | Chamberlain ................ 312/236 |
| 2008/0223557 A1 | 9/2008 | Fulton et al. |
| 2009/0121562 A1 | 5/2009 | Yim |
| 2009/0174278 A1 | 7/2009 | Sheaffer et al. |
| 2009/0206687 A1 | 8/2009 | Woody et al. |
| 2010/0026111 A1 | 2/2010 | Monzel |
| 2010/0033040 A1 * | 2/2010 | Wakita .......................... 310/54 |
| 2010/0102649 A1 | 4/2010 | Cherney et al. |
| 2010/0109454 A1 | 5/2010 | Vadillo et al. |
| 2010/0176668 A1 | 7/2010 | Murakami |
| 2011/0050141 A1 | 3/2011 | Yeh et al. |
| 2011/0101700 A1 | 5/2011 | Stiesdal |
| 2011/0109095 A1 | 5/2011 | Stiesdal |

FOREIGN PATENT DOCUMENTS

| | | |
|---|---|---|
| JP | 06-036364 U | 5/1994 |
| JP | 06-311691 A | 11/1994 |
| JP | 07-264810 A | 10/1995 |
| JP | 08-019218 A | 1/1996 |
| JP | 09-046973 A | 2/1997 |
| JP | 09-154257 A | 6/1997 |
| JP | 10-234157 A | 9/1998 |
| JP | 11-132867 A | 5/1999 |
| JP | 11-206063 A | 7/1999 |
| JP | 2000-152563 A | 5/2000 |
| JP | 2000-324757 A | 11/2000 |
| JP | 2000-333409 A | 11/2000 |
| JP | 2001-333559 A | 11/2001 |
| JP | 2002-095217 A | 3/2002 |
| JP | 2002-119019 A | 4/2002 |
| JP | 2003-250247 A | 9/2003 |
| JP | 2003-299317 A | 10/2003 |
| JP | 2003-324901 A | 11/2003 |
| JP | 2004-215353 A | 7/2004 |
| JP | 2004-236376 A | 8/2004 |
| JP | 2004-248402 A | 9/2004 |
| JP | 2004-297924 A | 10/2004 |
| JP | 2004-312886 A | 11/2004 |
| JP | 2004-357472 A | 12/2004 |
| JP | 2005-012989 A | 1/2005 |
| JP | 2005-057957 A | 3/2005 |
| JP | 2005-168265 A | 6/2005 |
| JP | 2006-060914 A | 3/2006 |
| JP | 2000-152561 A | 9/2006 |
| JP | 2006-297541 A | 11/2006 |
| JP | 2006-528879 A | 12/2006 |
| JP | 2007-282341 A | 10/2007 |
| JP | 2008-021950 A | 2/2008 |
| JP | 2008-206213 A | 9/2008 |
| JP | 2008-219960 A | 9/2008 |
| JP | 4187606 B2 | 11/2008 |
| JP | 2008-544733 A | 12/2008 |
| JP | 2009-247084 A | 10/2009 |
| JP | 2009-247085 A | 10/2009 |
| JP | 2009-254205 A | 10/2009 |
| JP | 2010-028908 A | 2/2010 |
| JP | 2010-028958 A | 2/2010 |
| JP | 2010-035265 A | 2/2010 |
| JP | 2010-063253 A | 3/2010 |
| JP | 2010-121701 A | 6/2010 |
| KR | 10-1997-0055103 A | 7/1997 |
| KR | 10-2000-0013908 A | 3/2000 |
| KR | 10-2006-0102496 A | 9/2006 |
| KR | 10-2007-0027809 A | 3/2007 |
| KR | 10-2009-0048028 A | 5/2009 |

OTHER PUBLICATIONS

International Search Report completed Apr. 9, 2012.
International Search Report, Received Jan. 9, 2012.
International Search Report, Received Feb. 16, 2012.
International Search Report, Received Dec. 22, 2011.
International Search Report, Received Dec. 5, 2011.
International Search Report, Received Dec. 27, 2011.
International Search Report completed Apr. 19, 2012.
International Search Report completed Apr. 20, 2012.
International Search Report completed Mar. 8, 2012.
International Search Report completed Apr. 24, 2012.
WIPO Search Report and Written Opinion dated Oct. 29, 2012 for corresponding Application No. PCT/US2012/033915; 8 sheets.
WIPO Search Report and Written Opinion dated Nov. 14, 2012 for corresponding Application No. PCT/US2012/040794; 8 sheets.

* cited by examiner

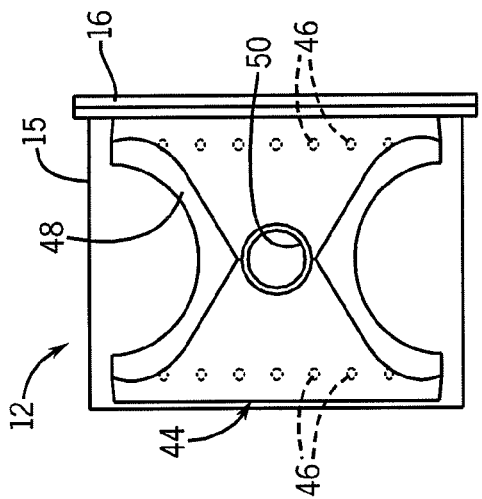
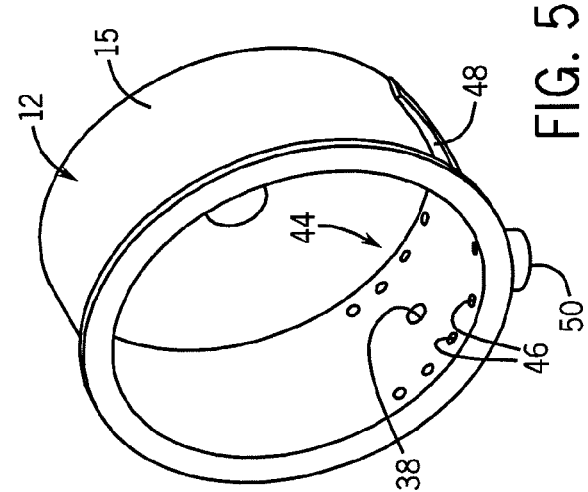
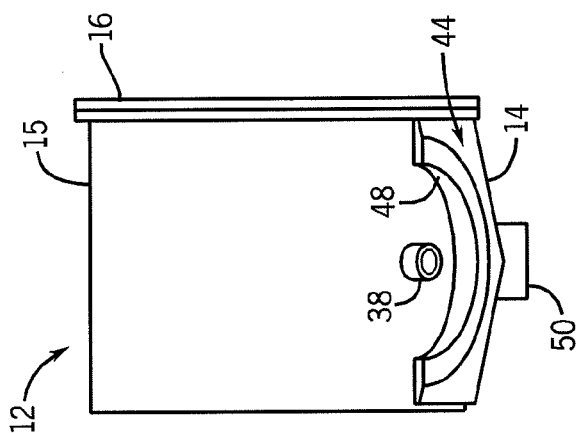

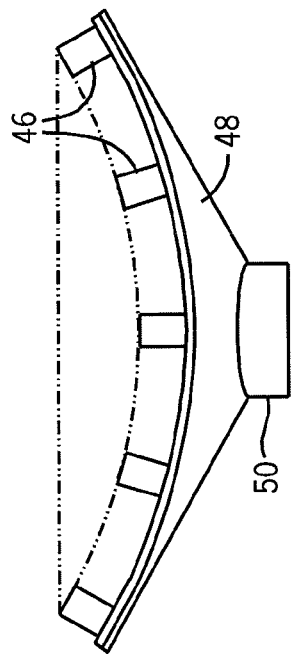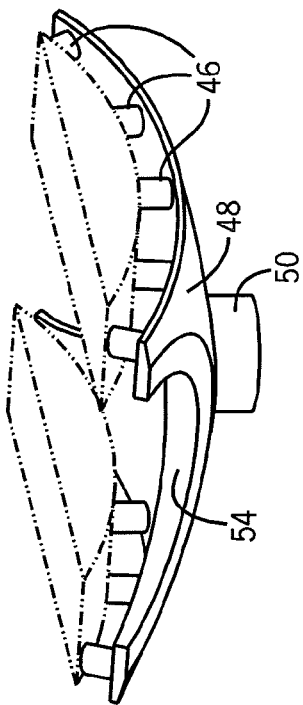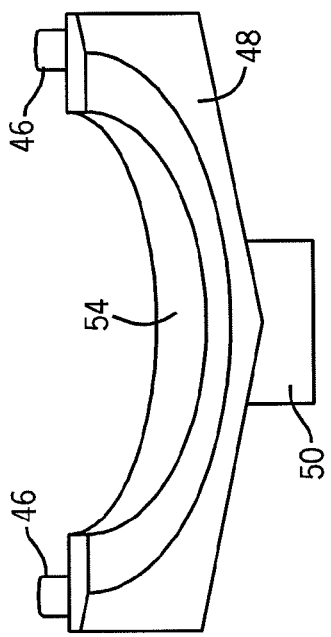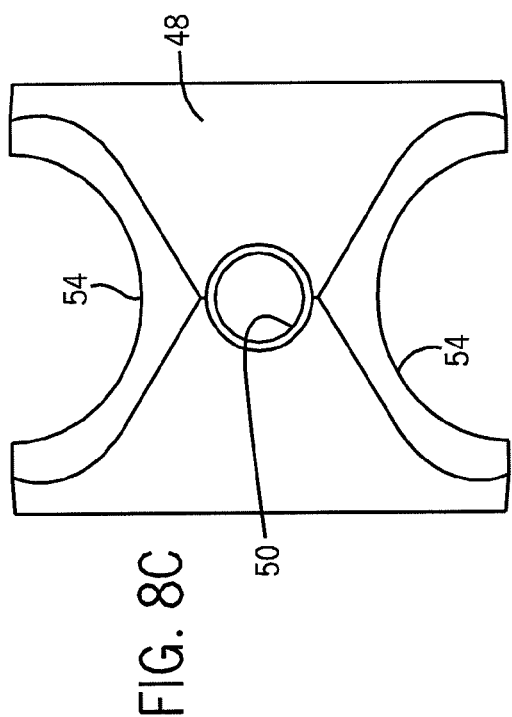

COOLANT DRAINAGE SYSTEM AND METHOD FOR ELECTRIC MACHINES

BACKGROUND

Conventional methods for cooling an electric machine include passing a coolant around an outer perimeter of the electric machine inside of a cooling jacket. The coolant extracts heat from a stator of the electric machine. In some machine designs, the level of heat removal is increased by spraying coolant from the cooling jacket directly onto end turns of the stator. The sprayed coolant drains toward the bottom of the electric machine's housing due to gravity and a drain hole is often located near the bottom of the housing to exhaust the coolant, as shown in FIG. 1A. However, as shown in FIGS. 1B and 1C, if the electric machine is tipped backward, excessive amounts of coolant can pool within the housing around the electric machine. During tipping, the height of the pooled coolant can increase enough to flood an air gap between the electric machine stator and the electric machine rotor, causing adverse effects such as relatively large spin losses and/or thermal failure of the electric machine.

SUMMARY

Some embodiments of the invention provide a coolant drainage system including a module housing with an inner wall and at least one end cap. The module housing at least partially defines a machine cavity and the coolant drainage system also includes an electric machine positioned inside the machine cavity and at least partially enclosed by the module housing. The electric machine includes a stator substantially circumscribing a rotor and an air gap at least partially defined between the stator and the rotor. The coolant drainage system further includes a drain pan coupled to the module housing and including a drain outlet, and a plurality of drain holes extending through the module housing and located adjacent to the drain pan. The plurality of drain holes provide fluid pathways from the machine cavity to the drain pan.

Some embodiments of the invention provide a method for draining coolant, the method may include providing an electric machine module comprising a module housing with at least one end cap and a plurality of drain holes, and at least partially enclosing an electric machine inside a machine cavity of the module housing. The electric machine can include a stator substantially circumscribing a rotor, and an air gap defined between the stator and the rotor. The method can also include coupling a drain pan, including a drain outlet, to the electric machine module, positioning the drain pan relative to the plurality drain holes so that the machine cavity is in fluid communication with the drain pan via the plurality drain holes, and introducing a coolant into the machine cavity. The method can further include allowing the coolant to flow substantially throughout the machine cavity, toward the plurality of drain holes, and to the drain pan through the plurality of drain holes so that the coolant pools below the air gap during rotation of the electric machine module.

Some embodiments of the invention provide a gravity-fed coolant drainage system. The coolant drainage system may include an electric machine with a rotor substantially circumscribed by a stator and an air gap defined between the rotor and the stator. The coolant drainage system can also include a module housing with an inner wall and at least one end cap. The module housing at least partially defines a machine cavity and at least partially encloses the electric machine within the machine cavity. The coolant drainage system can further include a drain pan coupled to the module housing and including a drain outlet, a first set of drain holes, and a second set of drain holes. The first set of drain holes are located near a first axial end of the module housing, are in fluid communication with the machine cavity and the drain pan, and are angularly spaced apart along the first axial end of the module housing. The second set of drain holes are located near a second axial end of the module housing, are in fluid communication with the machine cavity and the drain pan, and are angularly spaced apart along the first axial end of the module housing. The first set of drain holes and the second set of drain holes are angularly spaced apart along an angular span of the module housing to provide gravity-fed drainage paths from the machine cavity over a range of rotation of the module housing so that a coolant pooling level inside the machine cavity remains below the air gap.

DESCRIPTION OF THE DRAWINGS

FIG. 3 is a side view of a module housing of an electric machine module according to another embodiment of the invention.

FIG. 4 is a bottom view of the module housing of FIG. 3.

FIG. 5 is a perspective internal view of the module housing of FIG. 3.

FIGS. 8A-8D are front, side, bottom, and perspective views of coolant flow through a drain pan of the electric machine module of FIG. 2.

DETAILED DESCRIPTION

Figure 1A:
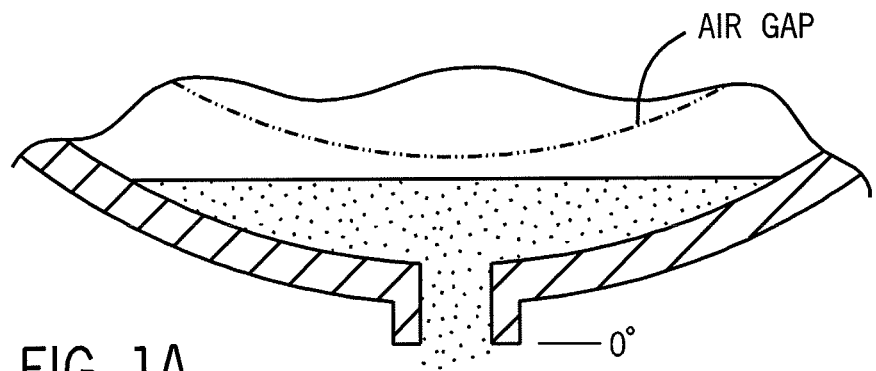
FIGS. 1A-1C are perspective views of a conventional electric machine module housing at different angles.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Figure 2:
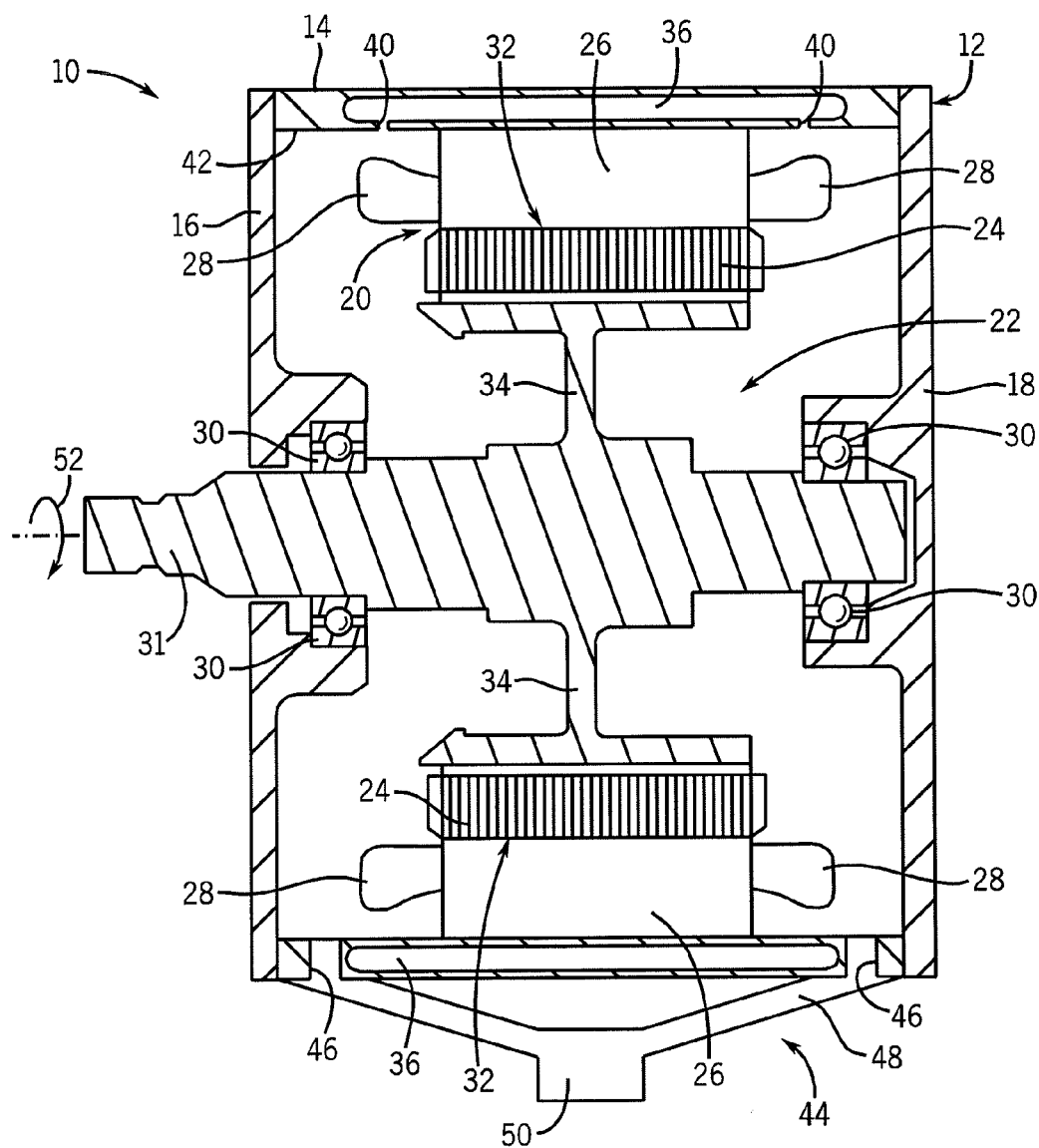
FIG. 2 is a front cross-sectional view of an electric machine module according to one embodiment of the invention.

FIG. 2 illustrates an electric machine module 10 according to one embodiment of the invention. The electric machine module 10 can include a module housing 12 comprising a sleeve member 14, a first end cap 16, and a second end cap 18. In one embodiment, the module housing 12 can be fabricated from cast aluminum. An electric machine 20 can be housed within a machine cavity 22 at least partially defined by the sleeve member 14 and the end caps 16, 18. For example, the sleeve member 14 and the end caps 16, 18 can be coupled via fasteners (not shown), or another suitable coupling manner, to enclose at least a portion of the electric machine 20 within the machine cavity 22. In some embodiments, the end caps 16, 18 can be identical parts. In other embodiments, the end caps 16, 18 can include different individual features. Also, in some embodiments, the housing 12 can comprise a substantially enclosed, substantially cylindrical canister 15 and a single end cap 16, as shown in FIGS. 3-5.

The electric machine 20 can include a rotor 24, a stator 26, stator end turns 28, and bearings 30, and can be disposed about a main output shaft 31. As shown in FIG. 2, the stator 26 can circumscribe the rotor 24, and a radial air gap 32 can be defined between the rotor 24 and the stator 26. In some embodiments, the electric machine 20 can also include a rotor hub 34 or can have a "hub-less" design (not shown). The electric machine 20 can be, without limitation, an electric motor, such as a hybrid electric motor, an electric generator, or a vehicle alternator. In one embodiment, the electric machine 20 can be a High Voltage Hairpin (HVH) electric motor for use in a hybrid vehicle.

Components of the electric machine 20 such as, but not limited to, the rotor 24, the stator 26, and the stator end turns 28 can generate heat during operation of the electric machine 20. These components can be cooled to enhance the performance of and increase the lifespan of the electric machine 20.

In some embodiments, as shown in FIG. 2, the module housing 12 can include a coolant jacket 36. The coolant jacket 36 can substantially circumscribe or at least partially surround the stator 26 and can contain a coolant, such as oil (e.g., motor oil, transmission oil, etc.) or a similar liquid coolant fluid. The coolant jacket 36 can be in fluid communication with a fluid source (not shown) containing the coolant. The coolant can be pressurized as it enters the coolant jacket 36 so that is circulated through the coolant jacket 36. Heat energy generated by the electric machine 20 can be transferred to the coolant as it circulates through the coolant jacket 36, thus cooling the electric machine 20. In some embodiments, the coolant can be introduced into the coolant jacket 36 via a coolant inlet 38. In one embodiment, as shown in FIG. 3, the coolant inlet 38 can be positioned near a generally lower portion of the module housing 12.

In some embodiments, the coolant jacket 36 can be formed within the sleeve member 14 or the canister 15 of the module housing 12, where a radially innermost wall 42 of the sleeve member 14 or the canister 15 can substantially separate the coolant jacket 36 from the machine cavity 22. In other embodiments, the module housing 12 can include an internal sleeve member (not shown) and the coolant jacket 36 can be defined between the internal sleeve member and the sleeve member 14 or the canister 15 (i.e., so that the internal sleeve member forms the inner wall 42 substantially separating the coolant jacket 36 and the machine cavity 22). In such embodiments, for example, the internal sleeve member can be a stainless steel ring that the stator 26 is pressed into.

The coolant circulating through the coolant jacket 36 can be sprayed or dispersed into the machine cavity 22 from coolant apertures 40 extending through the inner wall 42 of the module housing 12, as shown in FIG. 2. The coolant apertures 40 can be axially located along the module housing 12 substantially adjacent to the stator end turns 28. As a result, the coolant can be dispersed from the coolant jacket 36, through the coolant apertures 40, and onto or around the stator end turns 28. The dispersed coolant can receive heat energy from the stator end turns 28, which can result in cooling of the electric machine 20. In one embodiment, the coolant apertures 40 can be circumferentially located around a generally upper portion of the module housing 12. In another embodiment, the coolant apertures 40 can be circumferentially located substantially entirely around the module housing 12. In other embodiments, the coolant apertures 38 can positioned to disperse coolant throughout the machine cavity 22 through other methods, such as through coolant channels (not shown) in the end caps 16, 18.

The dispersed coolant can flow down toward a lower portion of the machine cavity 22 due to gravity. As the dispersed coolant flows downward, it can continue to remove heat energy from the electric machine components, such as, but not limited to, the stator 26, the rotor 24, the rotor hub 34, and the bearings 30. The dispersed coolant can then pool near the lower portion of the machine cavity 22. After pooling near the lower portion of the machine cavity 22, the coolant can still be substantially cooler than the electric machine components it is in contact with, such as the stator 26 and the stator end turns 28, and thus, can continue to remove heat energy from the stator 26 and the stator end turns 28.

In some embodiments, the electric machine module 10 can include a drainage system 44 to remove the pooled coolant from the machine cavity 22. As shown in FIG. 2, the drainage system 44 can include drain holes 46 extending through the module housing 12 (i.e., through the sleeve member 14, the canister 15, the internal sleeve member, and/or the end caps 16, 18 in some embodiments) and a drain pan 48.

In one embodiment, the drain holes 46 can be located near each axial end of the module housing 12, and can be angularly spaced apart from one another across an angular span of the module housing 12. More specifically, the drain holes 46 can include a first set along one axial end of the module housing and a second set along another axial end of the module housing, where both the first set and the second set can be located circumferentially apart from one another along the lower portion of the module housing 12, as shown in FIGS. 4 and 5. For example, on either axial end of the module housing 12, a central drain hole 46 can be located substantially at the bottom center of the module housing 12, and one to four additional drain holes 46 can be located circumferentially along the module housing 12 on either side of the central drain hole 46 (i.e., resulting in three to nine drain holes 46 on either axial end of the module housing 12) in order to provide gravity-fed drainage pathways for the coolant within the machine cavity 22. In some embodiments, more than nine drain holes 46 can be included in the module housing 12, depending on the application use of the electric machine module 10. In addition, in one embodiment, the angular span along which the drain holes 46 are located can be about 90 degrees (i.e., about 45 degrees in either direction from the bottom center of the module housing 12).

By being angularly displaced, the drain holes 46 can allow for normal functioning of the drainage system 44 if the electric machine 20 is tipped or rotated forward and backward (i.e., about a rotational axis 52 of the electric machine 12, as shown in FIG. 2). In addition, by being axially displaced, the drain holes 46 can allow for normal functioning of the drainage system 44 if the electric machine 20 is tipped or rotated toward one side or another side (i.e., about an axis normal to the rotational axis 52). In some embodiments, the drain holes 46 can be located axially inward closer to the stator 26 (e.g., than the axial ends of the module housing 12) in order to minimize the impact of side-to-side tipping of the electric machine 20 on coolant drainage.

The quantity of drain holes 46 can include two or more and can be selected based on a size of the machine cavity 22, a desired amount of coolant pooling, and other factors. In addition, one or more diameters of the drain holes 46 and the angular spacing of the drain holes 46 can be selected based on the size of the machine cavity 22, the desired level of coolant pooling and other factors. For example, the size of the machine cavity 22 and the desired level of coolant pooling can affect the hydrostatic pressure that develops within the pooled coolant as a consequence of gravity and its depth. A deeper pool of coolant can more effectively cool the electric machine 20 because more of the electric machine 20 can be in direct contact with the coolant. A deeper coolant pool also provides a higher hydrostatic pressure and, therefore, a higher flow rate through a given restriction (e.g., the drain holes 46). In one embodiment, a electric machine module 10 (e.g., an HVH410 series electric motor, manufactured by Remy International, Inc.) including five 12-millimeter drain holes 46 on either axial side can withstand a maximum flow rate of about 21 liters per minute into the machine cavity 22 before the air gap 32 is flooded.

Figure 1B:
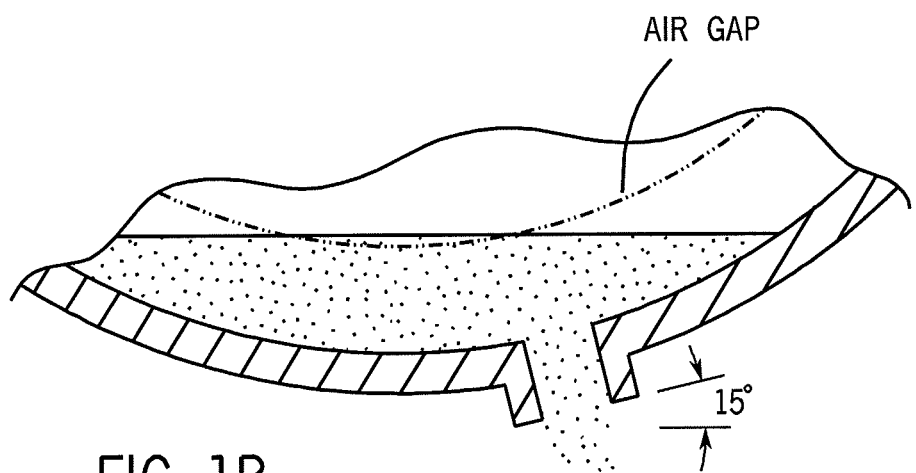
Figure 1C:
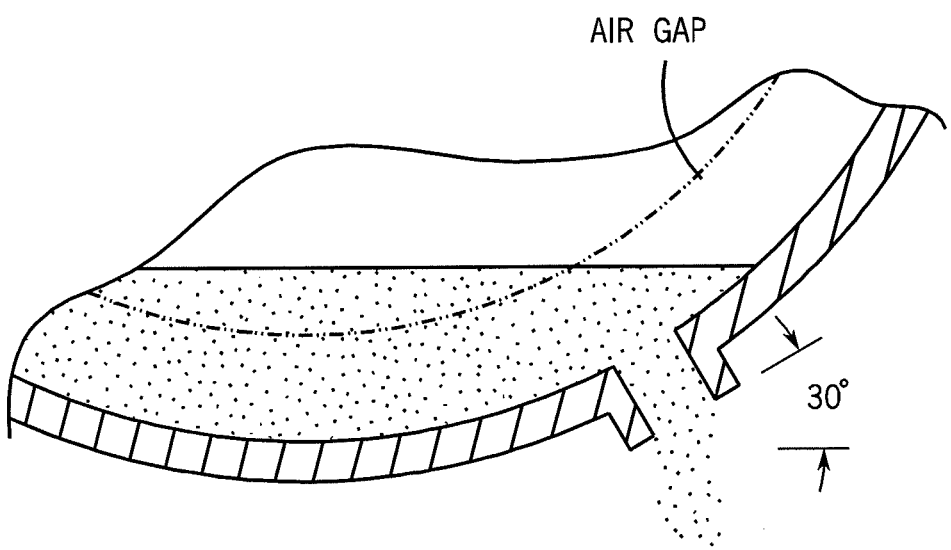

A deeper coolant pool can also affect the electric machine operation when it is tipped. Conventional housings with a large, single drain hole can be very sensitive to tip angle. For example, as shown in FIGS. 1B and 1C, tipping or rotating a conventional housing (i.e., relative to the rotational axis 52) raises the level of the pooled coolant, which can result in flooding of the air gap 32 between the stator 26 and the rotor 24. Due to the multiple drain holes 46 of the drainage system 44, the electric machine module 10 can exhibit a more consistent flow resistance as a function of tip angle versus the single, large drain hole of conventional housings. This can allow a more consistent pooling depth despite tipping, thus allowing a maximum constant depth, or coolant pooling level 54, with minimal risk of flooding the air gap 32, as shown in FIGS. 6A-6C.

Figure 6A:
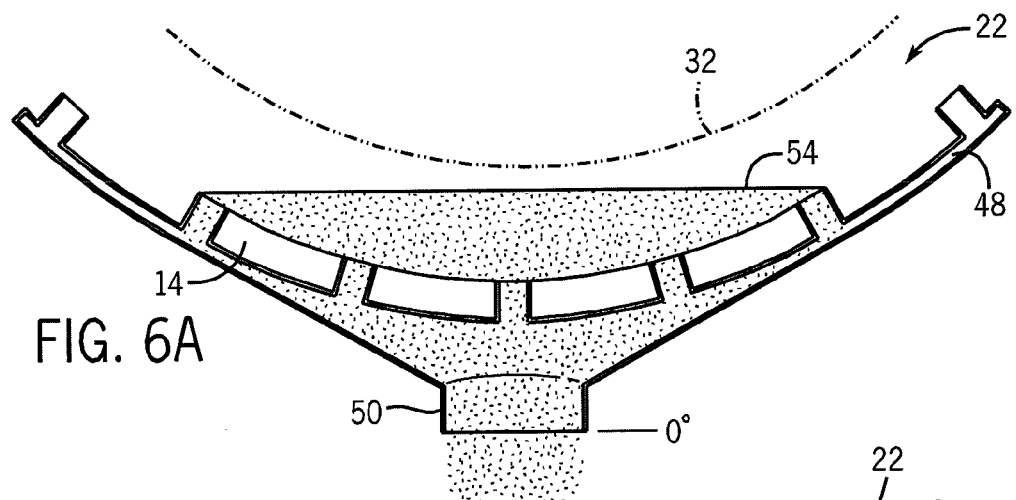
FIGS. 6A-6C are perspective views of a module housing of the electric machine module of FIG. 2 at different angles.

For example, FIG. 6A illustrates a lower portion of the electric machine module 10 at a zero-degree angle of rotation (i.e., a zero-degree tip angle). As shown in FIG. 6A, the coolant pooling level 54 is below the air gap 32. FIG. 6B illustrates the lower portion of the electric machine module 10 at a 15-degree angle of rotation in a first direction. As shown in FIG. 6B, the coolant pooling level 54 can still be below the air gap 32 despite the rotation. Similarly, due to the symmetry of the drain holes 46 (i.e., an equal amount of drain holes 46 on either side of the bottom drain hole 46), a coolant pooling level 54 can be substantially equal when the electric machine module 10 is rotated 15 degrees in the first direction or in a second direction (i.e., opposite the first direction). FIG. 6C illustrates the lower portion of the electric machine module 10 at a 30-degree angle of rotation. As shown in FIG. 6C, the coolant pooling level 54 can still be below the air gap 32 despite the additional rotation. Due to the symmetry of the drain holes 46, the coolant pooling level can be substantially equal whether the electric machine module 10 is tipped 30 degrees in the first direction or the second direction.

Figure 6B:
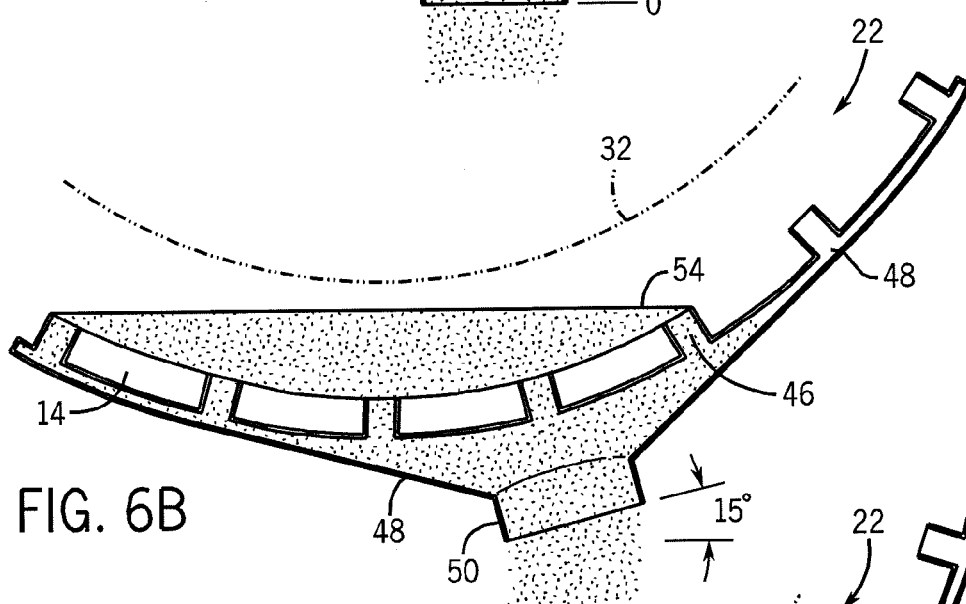
Figure 6C:
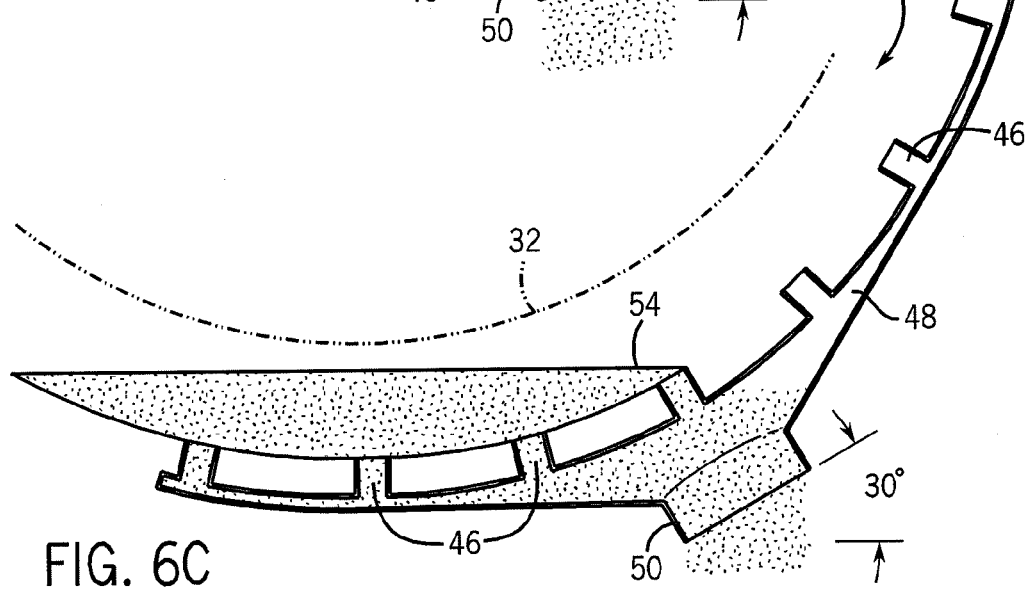

As shown in FIGS. 6A-6C, the electric machine module 10, including the drainage system 44, can maintain the coolant pooling level 54 below the air gap 32 (i.e., so that it does not flood the air gap 32) despite rotation up to, or greater than, about 30 degrees in either the first direction or the second direction. In some embodiments, the range of rotation can be greater than or less than about 30 degrees, depending on the positioning and quantity of drain holes 46. For example, a lower value of the range of rotation can be about zero degrees (i.e., where the module housing 12 is substantially upright) and an upper value of the range of rotation can be between about 1 degree and about 30 degrees. In some embodiments, the range of rotation can be defined between the substantially upright position of the electric machine module 10 and a rotated position which causes the pooled coolant to flood the air gap 32 (i.e., a maximum rotation angle). In other embodiments, the range of rotation can be defined between the substantially upright position of the electric machine module 10 and a rotated position just below maximum rotation where the coolant pooling level has not yet flooded the air gap 32 (i.e., a maximum operative rotation angle).

Figure 7:
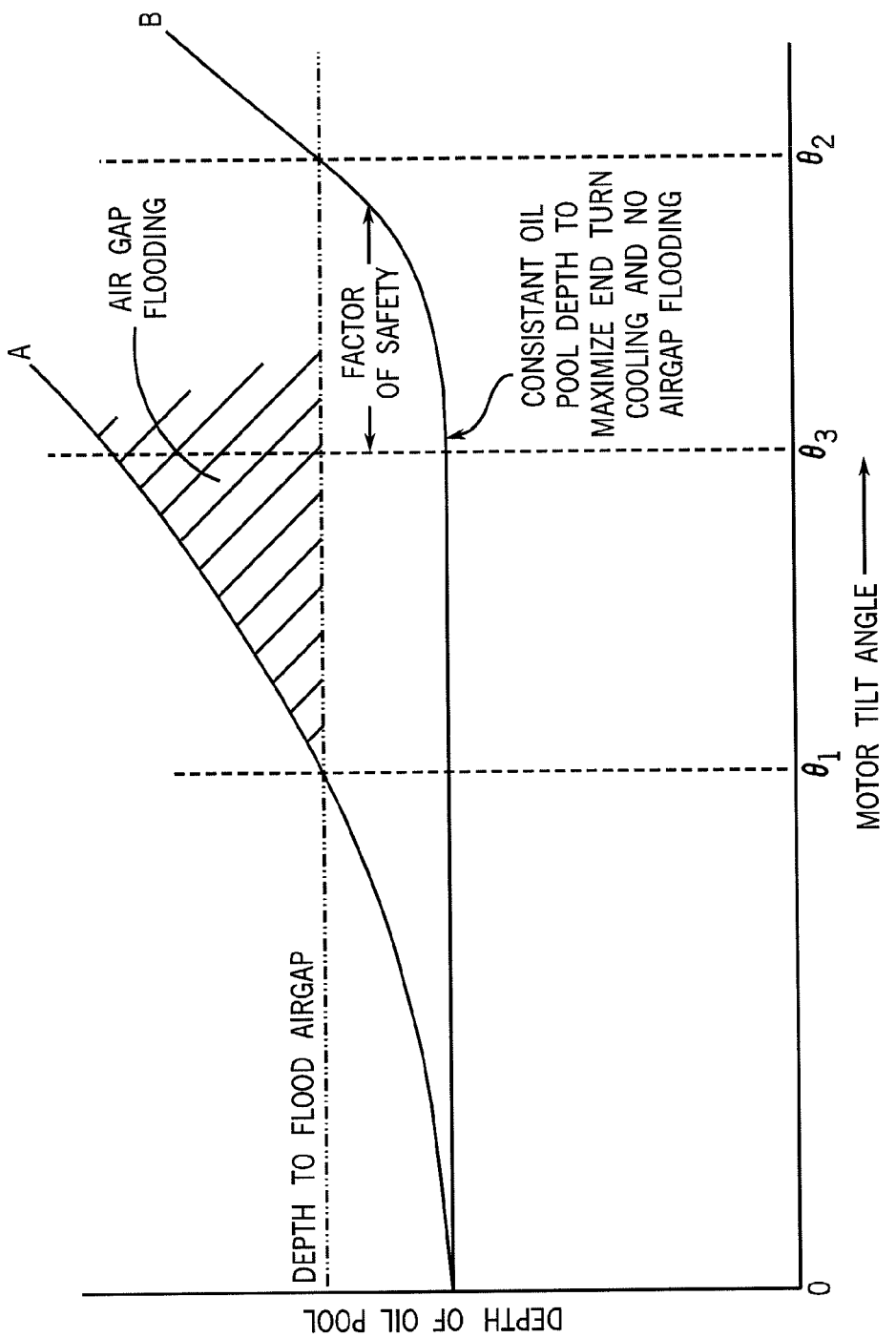
FIG. 7 is a chart illustrating depth of a pooled coolant inside a module housing at different angles.

FIG. 7 illustrates a graph of coolant pool depth at machine tilt angles for a conventional, single-hole housing (line A) and the multiple drain hole module housing 12 of FIGS. 6A-6C (line B). As shown in FIG. 7, the multiple drain hole module housing 12 can permit further tilting (i.e., a larger range of rotation) than the conventional housing without flooding the air gap 32. More specifically, the conventional housing can be rotated up to a maximum rotation angle $\theta_1$ before the air gap 32 is flooded. The multiple drain hole module housing 12 can be rotated up to a maximum rotation angle $\theta_2$, which is larger than $\theta_1$, before the air gap 32 is flooded. Also, as shown in FIG. 7, the multiple drain hole module housing 12 can permit a more consistent coolant pooling level 54 over a wider range of rotation compared to the single-hole housing. This consistency can maximize the coolant pooling level 54 substantially independent of tip angle over the range of rotation, which can provide more efficient cooling of the stator assembly 26 compared to conventional electric machine modules.

In some embodiments, the number of drain holes 46, the size of the machine cavity 22, and/or the desired level of coolant pooling can also be selected based on the applications for which the electric machine 20 is intended to be used and how much tipping (i.e., range of rotation) would be anticipated in such applications. In addition, in some embodiments, the electric machine module 10 can be manufactured using the range of rotation which includes the maximum operative rotation angle ($\theta_3$ in FIG. 7), as described above, rather than the maximum rotation angle ($\theta_2$ in FIG. 7), in order to provide a safety factor or window during operation to further reduce the risk of flooding the air gap 32.

In some embodiments, the number of drain holes 46, the size of the machine cavity 22, and/or the desired amount of coolant pooling can also be based on operating temperature ranges of the electric machine 20. For example, in one embodiment, the drainage system 44 can function over substantially all operating temperature ranges of the electric machine 20, despite the impact the temperature may have on the viscosity and flow rates of the coolant.

In addition, due to the multiple drain holes 46, the diameter of each individual hole 46 can be smaller. This can help reduce the axial length of the sleeve member 14 and/or the module housing 12. In some embodiments, the drain holes 46 can be drilled into the sleeve member 14. By utilizing drilled holes 46 versus hard tooled casting features, the drainage system 44 can be tailored or customized to a given customer application and desired coolant flow rate more cost effectively.

In some embodiments, the drain pan 48, which can include a drain outlet 50, can be coupled to the module housing 12 adjacent to the drain holes 46, as shown in FIGS. 2 and 6A-6C. As a result, the drain holes 46 on either axial end of the module housing 12 can be in fluid communication with the drain pan 48. As a result, the pooled coolant can drain out of the drain holes 46 to the drain pan 48 and can then be funneled through the drain outlet 50 by gravity. The drain outlet 50 can be fluidly connected to an external cooler (e.g., a heat exchanger, radiator, etc.) so that the coolant exhausted from the module housing 12 can be cooled and cycled back through the coolant inlet 38 to the coolant jacket 36. A conventional connection hose or similar (not shown) can be coupled to the drain outlet 50 to fluidly connect the drain out to the external cooler and/or a pump.

In some embodiments, the drain pan 48 can comprise cast aluminum and can be coupled to an exterior of the module housing 12, as shown in FIG. 2, for example using conventional compression gaskets and/or threaded fasteners. As shown in FIGS. 2, 8A, and 8B, the drain pan 48 can taper downward toward the drain outlet 50 to permit coolant to be gravity-fed toward the drain outlet 50. In some embodiments, as shown in FIGS. 8C and 8D, one or more ends 54 of the drain pan 48 can be indented to provide clearance for the coolant inlet 38. Permitting positioning of the coolant inlet 38 near the lower portion of the module housing 12 can provide a conventional, yet thermally effective and lower cost inlet feed design to be utilized. For example, module housings with the coolant inlet 38 near the upper portion can require additional baffles for circulating the coolant past the coolant apertures 40, and thus, can be more costly.

The drain pan 48 can be indented, shaped, or positioned differently to provide clearance for any other pre-existing hardware or features common to some applications. For example, an application-specific or customer-specific mold can be created to cast the drain pan 48, rather then requiring entirely new module housings or electric machine modules for different applications. This can also allow use of a common electric machine module for a variety of applications (e.g., with different mounting conditions, positions, etc.) only requiring a customized add-on drain pan 48. This can minimize machining and fabrication costs by reducing the need for full customized module housings.

It will be appreciated by those skilled in the art that while the invention has been described above in connection with particular embodiments and examples, the invention is not necessarily so limited, and that numerous other embodiments, examples, uses, modifications and departures from the embodiments, examples and uses are intended to be encompassed by the claims attached hereto. Various features and advantages of the invention are set forth in the following claims.

The invention claimed is:

1. A gravity-fed coolant drainage system comprising:
   an electric machine including a rotor substantially circumscribed by a stator and an air gap defined between the rotor and the stator;
   a module housing including a first axial end and a second axial end, an inner wall and at least one end cap,
   the module housing least partially defining a machine cavity and at least partially enclosing the electric machine within the machine cavity;
   a drain pan coupled to the module housing and including a drain outlet
   the drain pan configured and arranged to permit liquid coolant to flow toward the drain outlet,
   the drain pan extending across a region radially outward from each axial end of the stator to near the first axial end and the second axial end of the module housing;
   a first set of drain holes extending through the module housing and located near the first axial end of the module housing, the first set of drain holes in fluid communication with the machine cavity and the drain pan, the first set of drain holes angularly spaced apart along the first axial end of the module housing; and
   a second set of drain holes extending through the module housing and located near the second axial end of the module housing, the second set of drain holes in fluid communication with the machine cavity and the drain pan, the second set of drain holes angularly spaced apart along the second axial end of the module housing,
   the first set of drain holes and the second set of drain holes angularly spaced apart along an angular span of the module housing to provide gravity-fed drainage paths from the machine cavity over a range of rotation of the module housing so that a liquid coolant pooling level inside the machine cavity remains below the air gap.

2. The gravity-fed coolant drainage system of claim 1, wherein the module housing includes a coolant jacket and the inner wall includes a plurality of coolant apertures in fluid communication with the coolant jacket and the machine cavity.

3. A gravity-fed coolant drainage system comprising:
   an electric machine including a rotor substantially circumscribed by a stator and an air gap defined between the rotor and the stator;
   a module housing including an inner wall and at least one end cap, the module housing at least partially defining a machine cavity and at least partially enclosing the electric machine within the machine cavity;
   a drain pan coupled to the module housing and including a drain outlet;
   a first set of drain holes extending through the module housing and located near a first axial end of the module housing, the first set of drain holes in fluid communication with the machine cavity and the drain pan, the first set of drain holes angularly spaced apart along the first axial end of the module housing; and
   a second set of drain holes extending through the module housing and located near the second axial end of the module housing, the second set of drain holes in fluid communication with the machine cavity and the drain pan, the second set of drain holes angularly spaced apart along the first axial end of the module housing,
   the first set of drain holes and the second set of drain holes angularly spaced apart along an angular span of the module housing to provide gravity-fed drainage paths from the machine cavity over a range of rotation of the module housing so that a coolant pooling level inside the machine cavity remains below the air gap; and
   wherein the module housing includes a coolant jacket and the inner wall includes a plurality of coolant apertures in fluid communication with the coolant jacket and the machine cavity; and
   wherein the drain pan includes at least one indented end, and the module housing includes a coolant inlet located adjacent to the at least one indented end and in fluid communication with the coolant jacket.

4. The gravity-fed coolant drainage system of claim 3, wherein a coolant introduced into the coolant jacket through the coolant inlet is capable of being dispersed through the coolant apertures into the machine cavity, and at least a portion of the coolant flows through the one of the first set of drain holes and the second set of drain holes to the drain pan so that the coolant pooling level of the coolant inside the machine cavity remains below the air gap.

5. The gravity-fed coolant drainage system of claim 4, wherein the plurality of drain holes are drilled into the module housing.

6. The gravity-fed coolant drainage system of claim 1 wherein the drain pan is at least partially tapered at least near the drain outlet.

7. The gravity-fed coolant drainage system of claim 1, wherein the range of rotation of the module housing is from about 0 degrees to an upper value in a first direction and a second direction opposite the first direction, wherein the upper value is about 30 degrees.

\* \* \* \* \*